United States Patent
Wang et al.

(10) Patent No.: US 9,110,530 B2
(45) Date of Patent: Aug. 18, 2015

(54) TOUCH PANEL DESIGN AND METHOD THEREOF

(71) Applicant: Henghao Technology Co., Ltd., Pingjhen, Taoyuan County (TW)

(72) Inventors: Cheng-Kai Wang, Pingjhen (TW); Wei-Wen Wang, Pingjhen (TW)

(73) Assignee: Henghao Technology Co., Ltd. (TW)

( * ) Notice: Subject to any disclaimer, the term of this patent is extended or adjusted under 35 U.S.C. 154(b) by 1 day.

(21) Appl. No.: 14/107,822

(22) Filed: Dec. 16, 2013

(65) Prior Publication Data

US 2015/0015498 A1 Jan. 15, 2015

(30) Foreign Application Priority Data

Jul. 12, 2013 (TW) .............................. 102125112 A

(51) Int. Cl.
*G06F 3/041* (2006.01)
*G09G 3/36* (2006.01)
*G06F 3/0488* (2013.01)

(52) U.S. Cl.
CPC .............. *G06F 3/041* (2013.01); *G06F 3/0488* (2013.01); *G09G 3/3648* (2013.01)

(58) Field of Classification Search
None
See application file for complete search history.

(56) References Cited

U.S. PATENT DOCUMENTS

2010/0302201 A1* 12/2010 Ritter et al. .................... 345/174

FOREIGN PATENT DOCUMENTS

| JP | 2010244357 A | 10/2010 |
| JP | 2012053812 A | 3/2012 |

OTHER PUBLICATIONS

Office Action issued in Korean Patent Application No. 9-5-2015-005206959 on Jan. 23, 2015, consisting of 12 pp. (English translation provided).

* cited by examiner

*Primary Examiner* — Muhammad N Edun
(74) *Attorney, Agent, or Firm* — Volpe and Koenig, P.C.

(57) ABSTRACT

Configurations of patterns on a touch panel and methods thereof are proposed. The proposed pattern uses a design unparallel to either one of the X axis and the Y axis of a black matrix of a pixel layout of an LCD panel to resolve the Moiré Phenomenon resulting from the interference between the touch panel and the pixel layout.

12 Claims, 5 Drawing Sheets

TOUCH PANEL DESIGN AND METHOD THEREOF

CROSS-REFERENCES TO RELATED APPLICATIONS

This application claims the benefits of Taiwan Patent Application Number 102125112 filed on Jul. 12, 2013, at the Taiwan Intellectual Property Office, the disclosures of which are incorporated herein in their entirety by reference.

FIELD OF THE INVENTION

The present invention relates to a touch panel design and a method thereof, in particular to a touch panel design and a method thereof for avoiding a Moiré phenomenon.

BACKGROUND OF THE INVENTION

The pixels on a liquid crystal display (LCD) are regularly arranged. When the electrode patterns on a touch panel are designed, the pixels are closer to one another with a smaller pitch, and the pixels are parallel to the electrode patterns, it is easy for a Moiré phenomenon to appear when the pixels overlap the electrode patterns. To counter this optical interference phenomenon, the regularity of the patterns must be interrupted in order to prevent the occurrence of the optical interference phenomenon of bright and dark fringes.

FIG. 1 shows a schematic diagram of the patterns in transparent conducting film (e.g. Indium Tin Oxide, ITO) on a conventional touch panel. In FIG. 1, the touch panel 1 includes a plurality of touch units 11.

FIG. 2 shows a schematic diagram of an RGB array on a conventional LCD panel. In FIG. 2, the RGB array 2 includes a plurality of RGB units.

FIG. 3(a) shows a schematic diagram of a conventional single touch unit 11. The conventional single touch unit 11 includes a first sensing line 111, a second sensing line 112, a first modifying area 113, a second modifying area 114, an isolation layer 115, a metal line 116, a first conducting layer free area 117, a second conducting layer free area 118, a first driving line 119, a second driving line 1110, a third modifying area 1111 and a fourth modifying area 1112. When each of the first to the fourth modifying areas 113, 114, 1111 and 1112 includes at least one auxiliary block, except for the first conducting layer free area 117 and the second conducting layer free area 118, the rest of the simple touch unit 11 is formed by a transparent conducting film, e.g. an ITO. And, when each of the first to the fourth modifying areas 113, 114, 1111 and 1112 includes zero auxiliary blocks, the first and the third modifying areas 113 and 1111 are a part of the first driving line 119, and the second and the fourth modifying areas 114 and 1112 are a part of the second driving line 1110. FIG. 3(b) shows a schematic diagram of the RGB array 2 of the conventional LCD as shown in FIG. 2. FIG. 3(c) is a schematic diagram showing the Moiré interference phenomenon resulting from the overlap of the single touch unit 11 as shown in FIG. 3(a) and the RGB array 2 of the conventional LCD as shown in FIG. 3(b). Thus, a method to overcome the limitations of the existing technologies to make the electrode patterns on the touch panel employ a design (unparallel to either the X or Y axis of the pixel layout of the LCD) to resolve the Moiré optical phenomenon resulting from the interference between the electrode patterns and the pixel layout, is worthy of further research and improvement.

Keeping the drawbacks of the prior arts in mind, and through the use of robust and persistent experiments and research, the applicant has finally conceived a touch panel design and a method thereof.

SUMMARY OF THE INVENTION

It is therefore an objective of the present invention to provide patterns on a touch panel using a design unparallel to either one of the X axis and the Y axis of a pixel layout of an LCD panel to solve the Moiré optical phenomenon resulting from the interference between the touch panel and the pixel layout.

In accordance with the first aspect of the present invention, a touch panel includes a plurality of touch units, each the touch unit has a first driving line, a second driving line, a first sensing line and a second sensing line, wherein the touch panel is configured on an LCD having a pixel layout, the pixel layout has a black matrix with an X axis and a Y axis, each of the first driving line, the second driving line, the first sensing line and the second sensing line has an edge with a plurality of turning angles, and each the edge is unparallel to either one of the X axis and the Y axis.

In accordance with the second aspect of the present invention, a touch panel includes a plurality of touch units, each the touch unit has a first driving line and a first sensing line, wherein the touch panel is configured on an LCD having a pixel layout, the pixel layout has a black matrix with an X axis and a Y axis, each of the first driving line and the first sensing line has an edge with a plurality of turning angles, and each the edge is unparallel to either one of the X axis and the Y axis.

In accordance with the third aspect of the present invention, a touch panel is configured on an LCD having a pixel layout, wherein the pixel layout has a black matrix with an X axis and a Y axis, the touch panel has a plurality of touch units, each the touch unit includes a plurality of electrode lines, each the electrode line has an edge, and each the edge is unparallel to either one of the X axis and the Y axis.

In accordance with the fourth aspect of the present invention, a method for eliminating a Moiré phenomenon on a touch panel includes: providing an LCD having a pixel layout, and the touch panel having a plurality of touch units, wherein the pixel layout has a black matrix with an X axis and a Y axis, each the touch unit includes a first driving line, a second driving line, a first sensing line and a second sensing line, and each of the lines has an edge including a plurality of turning angles; and causing each the edge unparallel to either one of the X axis and the Y axis to avoid the Moiré phenomenon generated between the touch panel and the pixel layout.

In accordance with the fifth aspect of the present invention, a method for eliminating a Moiré phenomenon on a screen, wherein the screen includes a touch panel and an LCD, the LCD has a pixel layout, the pixel layout has a black matrix with an X axis and a Y axis, and the touch panel includes a plurality of touch units, comprises: providing a plurality of electrode lines for each the touch unit, each the electrode line has an edge; and causing each the edge unparallel to either one of the X axis and the Y axis.

BRIEF DESCRIPTION OF THE DRAWINGS

Other objectives, advantages and efficacy of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

Figure 1:
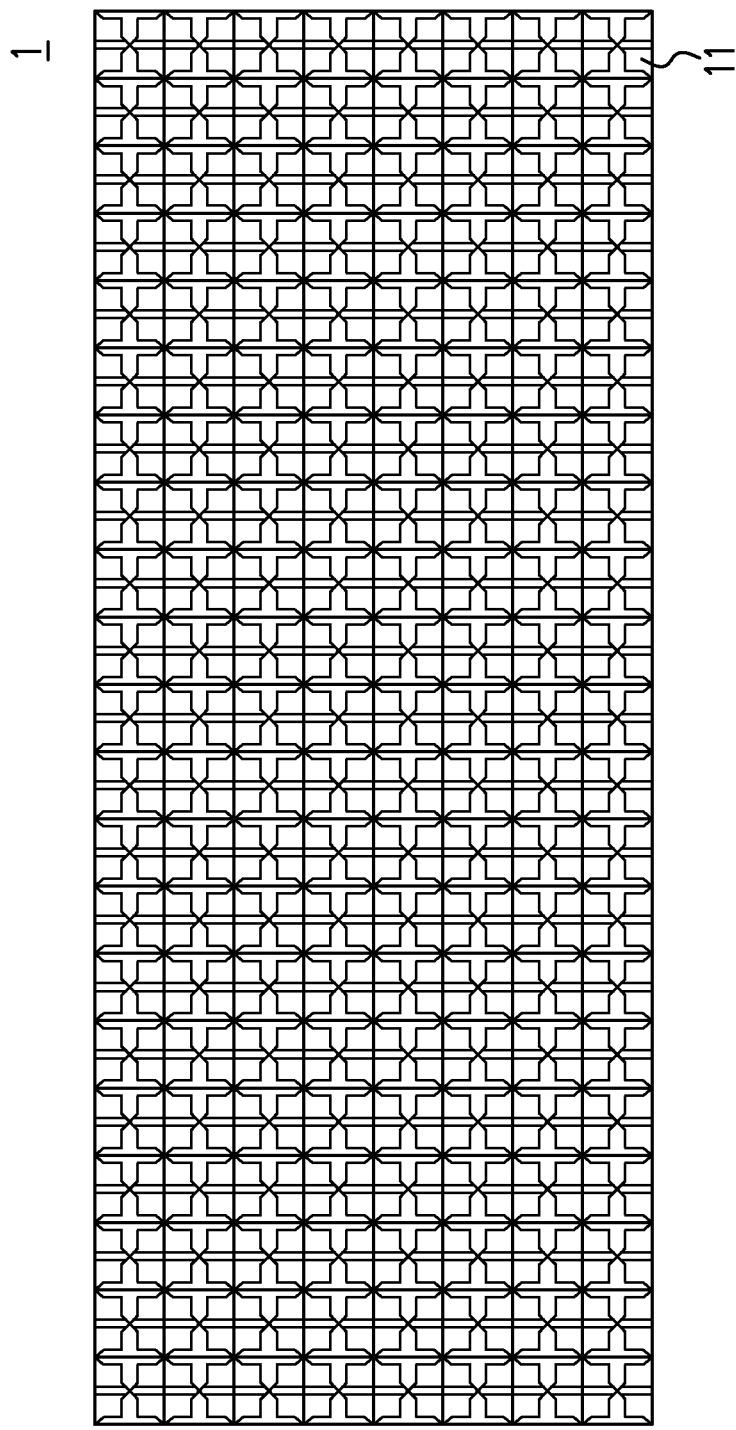
FIG. 1 is a schematic diagram of patterns of a transparent conducting film (e.g. ITO) on a conventional touch panel.
Figure 2:
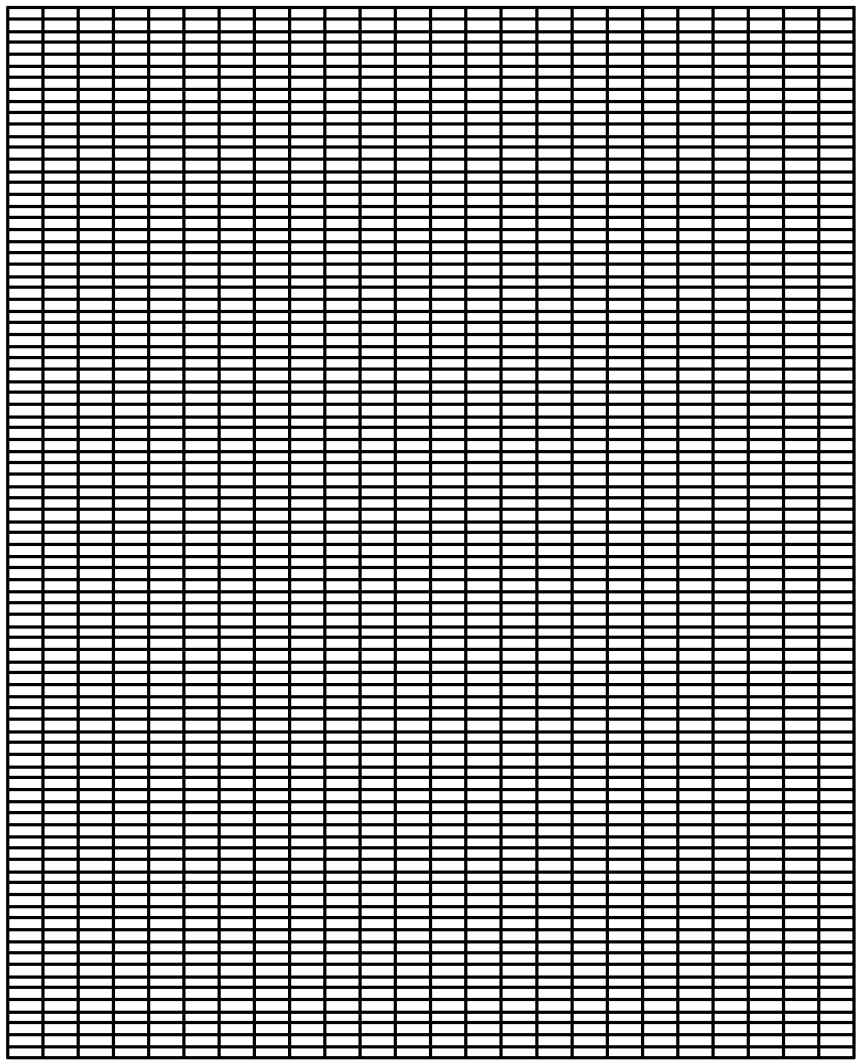
FIG. 2 is a schematic diagram of an RGB array on a conventional LCD.
Figure 3C:
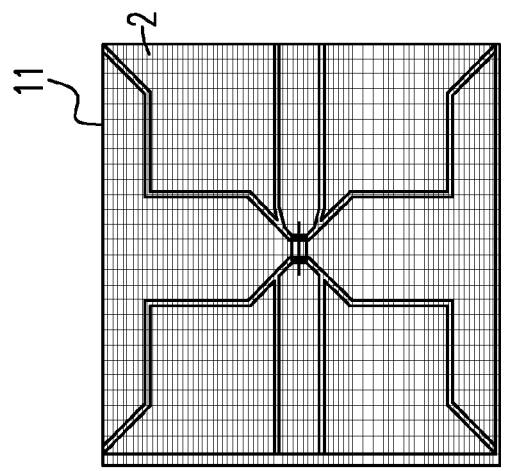
FIG. 3(c) is a schematic diagram showing the Moiré interference phenomenon resulting from the overlap of the single touch unit 11 as shown in FIG. 3(a) and the RGB array 2 of the conventional LCD as shown in FIG. 3(b).
Figure 3B:
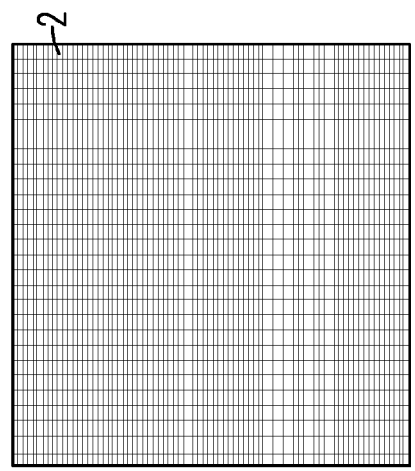
FIG. 3(b) is a schematic diagram of the RGB array 2 of the conventional LCD as shown in FIG. 2.
Figure 3A:
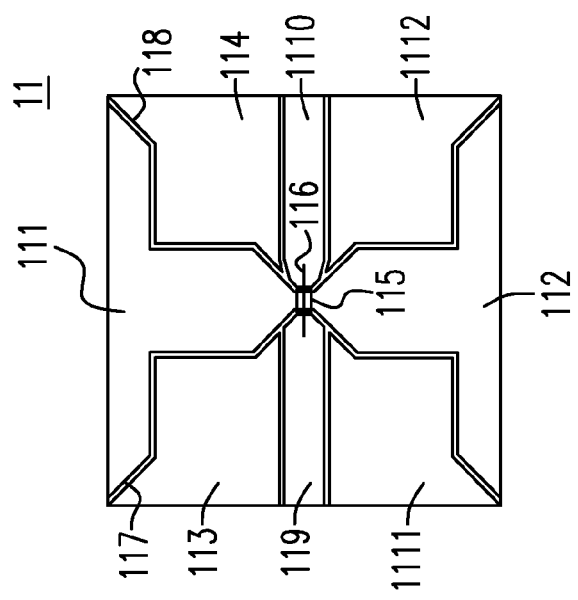
FIG. 3(a) is a schematic diagram of a conventional single touch unit.
Figure 4:
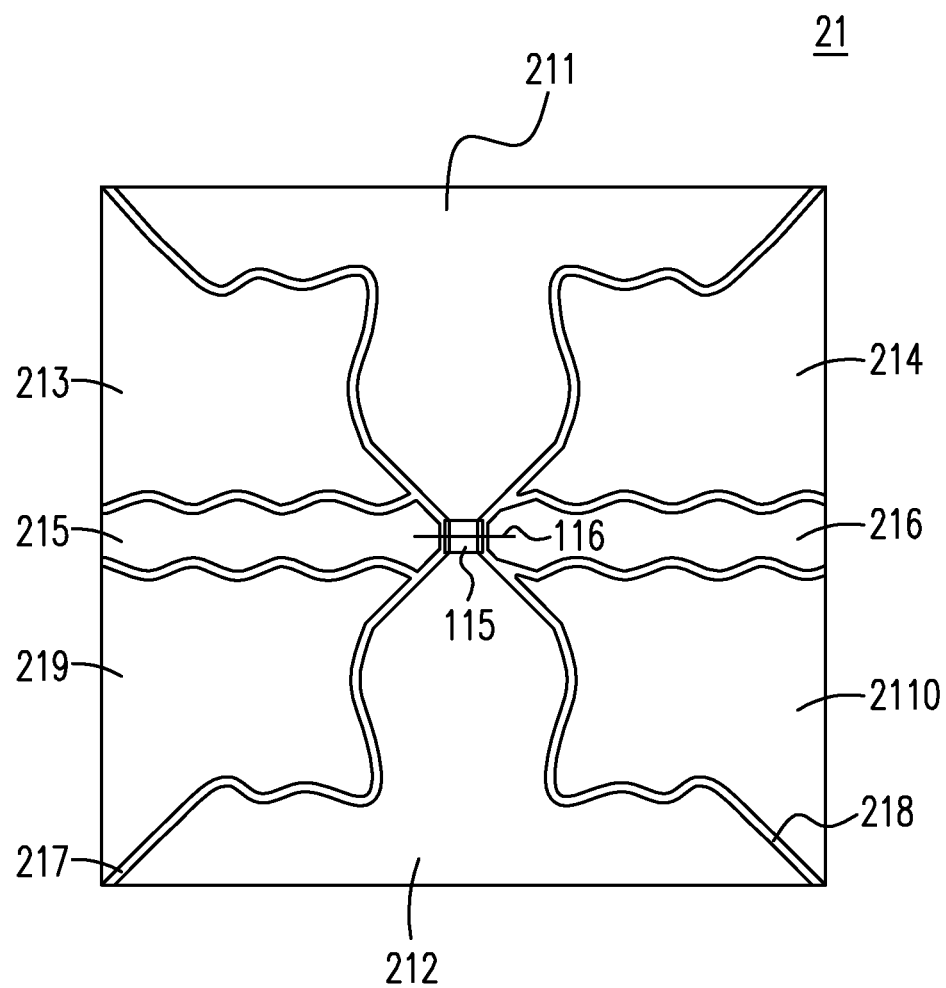
FIG. 4 is a schematic diagram of a single touch unit according to the first preferred embodiment of the present invention.

FIG. 4 shows a schematic diagram of a single touch unit according to the first preferred embodiment of the present invention. In FIG. 4, the single touch unit 21 includes a first sensing line 211, a second sensing line 212, a first modifying area 213, a second modifying area 214, an isolation layer 115, a metal line 116, a first driving line 215, a second driving line 216, a first conducting layer free area 217, a second conducting layer free area 218, a third modifying area 219 and a fourth modifying area 2110. Each of the first to the fourth modifying areas 213, 214, 219 and 2110 includes zero, or at least one auxiliary block (e.g. a dummy ITO). When each of the first to the fourth modifying areas 213, 214, 219 and 2110 includes at least one auxiliary block, except for the first conducting layer free area 217 and the second conducting layer free area 218, the rest of the simple touch unit 21 is formed by a transparent conducting film, e.g. an ITO. And, when each of the first to the fourth modifying areas 213, 214, 219 and 2110 includes zero auxiliary blocks, the first and the third modifying areas 213 and 219 are a part of the first driving line 215, and the second and the fourth modifying areas 214 and 2110 are a part of the second driving line 216. A touch panel including the single touch unit 21 is configured on an LCD having a pixel layout, and the pixel layout has a black matrix with an X axis and a Y axis. As shown in FIG. 4, each the edge of the first sensing line 211, the second sensing line 212, the first driving line 215 and the second driving line 216 is a curve, and each the curve is unparallel to the X axis and the Y axis. A turning angle is an angle between each the curve and a line parallel to the X axis or the Y axis, and is unequal to 0 degrees, 90 degrees, or 180 degrees to avoid a Moiré phenomenon being generated between the touch panel and the pixel layout.

Figure 5:
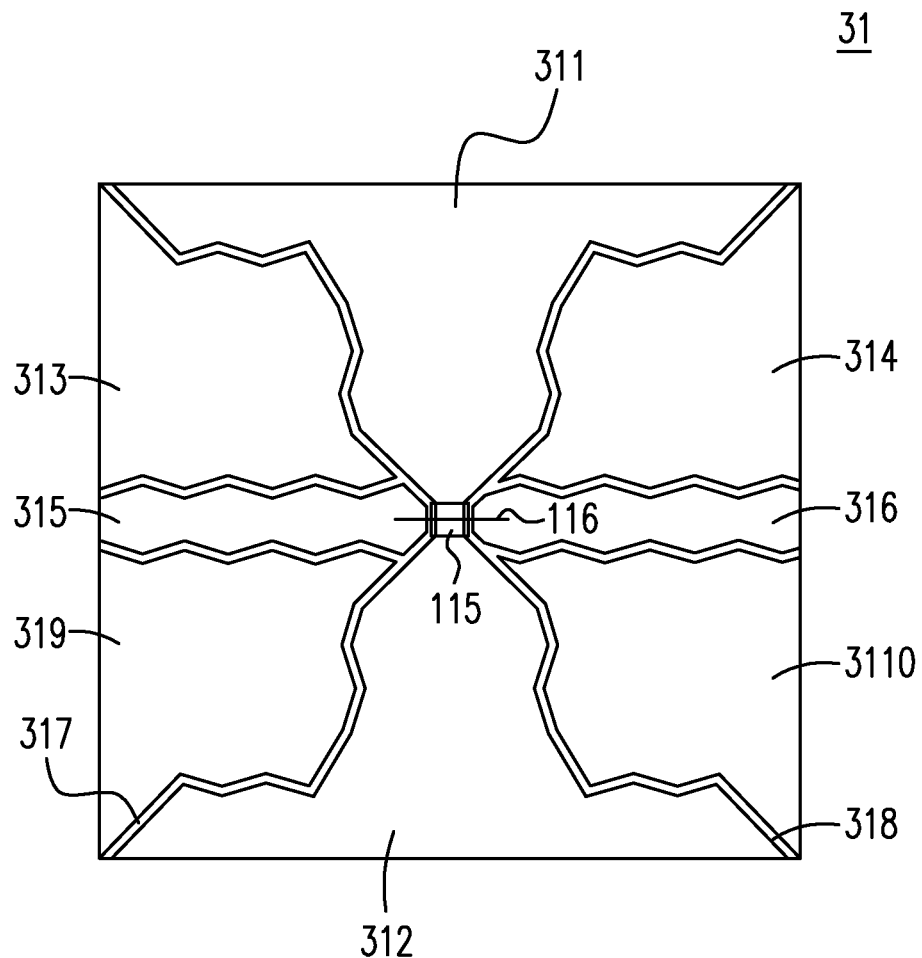
FIG. 5 is a schematic diagram of a single touch unit according to the second preferred embodiment of the present invention.

FIG. 5 shows a schematic diagram of a single touch unit according to the second preferred embodiment of the present invention. In FIG. 5, the single touch unit 31 includes a first sensing line 311, a second sensing line 312, a first modifying area 313, a second modifying area 314, an isolation layer 115, a metal line 116, a first driving line 315, a second driving line 316, a first conducting layer free area 317, a second conducting layer free area 318, a third modifying area 319 and a fourth modifying area 3110. Each of the first to the fourth modifying areas 313, 314, 319 and 3110 includes zero, or at least one auxiliary block (e.g. a dummy ITO). When each of the first to the fourth modifying areas 313, 314, 319 and 3110 includes at least one auxiliary block, except for the first conducting layer free area 317 and the second conducting layer free area 318, the rest of the simple touch unit 31 is formed by a transparent conducting film, e.g. an ITO. And, when each of the first to the fourth modifying areas 313, 314, 319 and 3110 includes zero auxiliary blocks, the first and the third modifying areas 313 and 319 are a part of the first driving line 315, and the second and the fourth modifying areas 314 and 3110 are a part of the second driving line 316. A touch panel including the single touch unit 31 is configured on an LCD having a pixel layout, and the pixel layout has a black matrix with an X axis and a Y axis. As shown in FIG. 5, each the edge of the first sensing line 311, the second sensing line 312, the first driving line 315 and the second driving line 316 is a series of segments, and each the series of segments is unparallel to the X axis and the Y axis. Each the series of segments has a plurality of turning angles. Each the turning angle of each the curve is an angle between each the curve and a line parallel to the X axis or the Y axis, and the angle is unequal to 0 degrees, 90 degrees, or 180 degrees to avoid a Moiré phenomenon being generated between the touch panel and the pixel layout.

EMBODIMENTS

1. A touch panel, comprising a plurality of touch units, each the touch unit comprises:
   a first driving line;
   a second driving line;
   a first sensing line; and
   a second sensing line,
   wherein the touch panel is configured on an LCD having a pixel layout, the pixel layout has a black matrix with an X axis and a Y axis, each of the first driving line, the second driving line, the first sensing line and the second sensing line has an edge with a plurality of turning angles, and each the edge is unparallel to either one of the X axis and the Y axis.

2. A touch panel according to Embodiment 1, wherein the second sensing line connects to the first sensing line at a cross-node of the X and the Y axes, each the touch unit further includes an isolation layer and a metal line, each the isolation layer is configured on the corresponding cross-node of the X and the Y axes, each the metal line is configured on the corresponding isolation layer and electrically connected to the first and the second driving lines, each the isolation layer is used to correspondingly isolate the first and the second driving lines and the first and the second sensing lines, each the turning angle of each the edge is an angle between a respective line parallel to one of the X axis and the Y axis, and the corresponding edge, and the angle is unequal to one being selected from a group consisting of 0 degrees, 90 degrees and 180 degrees so as to avoid a Moiré phenomenon being generated between the touch panel and the pixel layout.

3. A touch panel according to Embodiment 1 or 2, wherein each the angle is between 20 degrees and 150 degrees, and unequal to 90 degrees, and each the edge is a curve.

4. A touch panel according to any one of the above-mentioned Embodiments, wherein each the touch unit further includes a first modifying area between the first sensing line and the first driving line, a second modifying area between the first sensing line and the second driving line, a third modifying area between the second sensing line and the first driving line, a fourth modifying area between the second sensing line and the second driving line, and each of the first to the fourth modifying areas includes one of zero auxiliary blocks and at least one auxiliary block.

5. A touch panel according to any one of the above-mentioned Embodiments, wherein when each of the first to the fourth modifying areas includes the at least one auxiliary block, there is a first conducting layer-free area among the first sensing line, the first modifying area, the first driving line, the third modifying area and the second sensing line, and there is a second conducting layer-free area among the first sensing line, the second modifying area, the second driving line, the fourth modifying area and the second sensing line; when the first modifying area includes zero auxiliary blocks, the first modifying area is a part of the first sensing line; when the second modifying area includes zero auxiliary blocks, the second modifying area is a further part of the first sensing line; when the third modifying area includes zero auxiliary blocks, the third modifying area is a part of the second sensing line; and when the fourth modifying area includes zero auxiliary blocks, the fourth modifying area is a further part of the second sensing line.

6. A touch panel according to any one of the above-mentioned Embodiments, wherein the first and the second driving lines, the first and the second sensing lines, and each of the at least one auxiliary block are formed by a transparent conducting film.

7. A touch panel, comprising a plurality of touch units, each the touch unit comprises:
   a first driving line; and
   a first sensing line,
   wherein the touch panel is configured on an LCD having a pixel layout, the pixel layout has a black matrix with an X axis and a Y axis, each of the first driving line and the first sensing line has an edge with a plurality of turning angles, and each the edge is unparallel to either one of the X axis and the Y axis.

8. A touch panel according to Embodiment 7, further comprising a second driving line and a second sensing line, wherein each of the second driving line and the second sensing line has an edge with a plurality of turning angles, and each the edge of the second driving line and the second sensing line is also unparallel to either one of the X axis and the Y axis to avoid a Moiré phenomenon being generated between the touch panel and the pixel layout.

9. A touch panel according to Embodiment 7 or 8, wherein each the turning angle of each the edge is an angle between each the edge and a line parallel to one of the X axis and the Y axis, and the angle is unequal to one being selected from a group consisting of 0 degrees, 90 degrees and 180 degrees.

10. A touch panel, being configured on an LCD having a pixel layout, wherein the pixel layout has a black matrix with an X axis and a Y axis, the touch panel has a plurality of touch units, each the touch unit includes a plurality of electrode lines, each the electrode line has an edge, and each the edge is unparallel to either one of the X axis and the Y axis.

11. A method for eliminating a Moiré phenomenon on a touch panel, comprising:
   providing an LCD having a pixel layout, and the touch panel having a plurality of touch units, wherein the pixel layout has a black matrix with an X axis and a Y axis, each the touch unit includes a first driving line, a second driving line, a first sensing line and a second sensing line, and each of the lines has an edge including a plurality of turning angles; and
   causing each the edge unparallel to either one of the X axis and the Y axis to avoid the Moiré phenomenon generated between the touch panel and the pixel layout.

12. A method for eliminating a Moiré phenomenon on a screen, wherein the screen includes a touch panel and an LCD, the LCD has a pixel layout, the pixel layout has a black matrix with an X axis and a Y axis, the touch panel includes a plurality of touch units, and the method comprises:
   providing a plurality of electrode lines for each the touch unit, each the electrode line has an edge; and
   causing each the edge unparallel to either one of the X axis and the Y axis.

According to the aforementioned descriptions, the present invention discloses patterns on a touch panel using a design unparallel to either one of the X axis and the Y axis of a pixel layout of the LCD to resolve the Moiré optical phenomenon resulting from the interference between the touch panel and the pixel layout to demonstrate the non-obviousness and novelty.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. A touch panel, comprising a plurality of touch units, each touch unit comprises:
   a first driving line;
   a second driving line;
   a first sensing line; and
   a second sensing line,
   wherein the touch panel is configured on an LCD having a pixel layout, the pixel layout has a black matrix with an X axis and a Y axis, each of the first driving line, the second driving line, the first sensing line and the second sensing line has an edge with a plurality of turning angles, each of which is between 20 degrees and 150 degrees, and not equal to 90 degrees, and each edge is not parallel to either one of the X axis and the Y axis.

2. A touch panel according to claim 1, wherein the second sensing line connects to the first sensing line at a cross-node of the X and the Y axes, each touch unit further includes an isolation layer and a metal line, each isolation layer is configured on the corresponding cross-node of the X and the Y axes, each metal line is configured on the corresponding isolation layer and electrically connected to the first and the second driving lines, each isolation layer is used to correspondingly isolate the first and the second driving lines and the first and the second sensing lines, each turning angle of each edge is an angle between a respective line parallel to one of the X axis and the Y axis, and the corresponding edge, and the angle is not equal unequal 90 degrees so as to avoid a Moiré phenomenon being generated between the touch panel and the pixel layout.

3. A touch panel according to claim 2, wherein each edge is a curve and a series of segments.

4. A touch panel according to claim 1, wherein each touch unit further includes a first modifying area between the first sensing line and the first driving line, a second modifying area between the first sensing line and the second driving line, a third modifying area between the second sensing line and the first driving line, a fourth modifying area between the second sensing line and the second driving line, and each of the first to the fourth modifying areas includes one of zero auxiliary blocks and at least one auxiliary block.

5. A touch panel according to claim 4, wherein when each of the first to the fourth modifying areas includes the at least one auxiliary block, there is a first conducting layer free area among the first sensing line, the first modifying area, the first driving line, the third modifying area and the second sensing line, and there is a second conducting layer free area among the first sensing line, the second modifying area, the second driving line, the fourth modifying area and the second sensing line; when the first modifying area includes zero auxiliary blocks, the first modifying area is a part of the first sensing line; when the second modifying area includes zero auxiliary blocks, the second modifying area is a further part of the first sensing line; when the third modifying area includes zero auxiliary blocks, the third modifying area is a part of the second sensing line; and when the fourth modifying area includes zero auxiliary blocks, the fourth modifying area is a further part of the second sensing line.

6. A touch panel according to claim 4, wherein the first and the second driving lines, the first and the second sensing lines, and each of the at least one auxiliary block are formed by a transparent conducting film.

7. A touch panel, comprising a plurality of touch units, each touch unit comprises:
 a first driving line; and
 a first sensing line,
  wherein the touch panel is configured on an LCD having a pixel layout, the pixel layout has a black matrix with an X axis and a Y axis, each of the first driving line and the first sensing line has an edge with a plurality of turning angles, each of which is between 20 degrees and 150 degrees, and not equal to 90 degrees, and each edge is not parallel to either one of the X axis and the Y axis.

8. A touch panel according to claim 7, further comprising a second driving line and a second sensing line, wherein each of the second driving line and the second sensing line has an edge with a plurality of turning angles, and each edge of the second driving line and the second sensing line is also not parallel to either one of the X axis and the Y axis to avoid a Moiré phenomenon being generated between the touch panel and the pixel layout.

9. A touch panel according to claim 8, wherein each turning angle of each edge is an angle between each edge and a line parallel to one of the X axis and the Y axis, and the angle of the edge of the second driving line and the second sensing line is not equal to one being selected from a group consisting of 0 degrees, 90 degrees and 180 degrees.

10. A touch panel, being configured on an LCD having a pixel layout, wherein the pixel layout has a black matrix with an X axis and a Y axis, the touch panel has a plurality of touch units, each the touch unit includes a plurality of electrode lines, each the electrode line has an edge with a plurality of turning angles, each of which is between 20 degrees and 150 degrees, and not equal to 90 degrees, and each edge is not parallel to either one of the X axis and the Y axis.

11. A method for eliminating a Moiré phenomenon on a touch panel, comprising:
 providing an LCD having a pixel layout, and the touch panel having a plurality of touch units, wherein the pixel layout has a black matrix with an X axis and a Y axis, each of the touch unit includes a first driving line, a second driving line, a first sensing line and a second sensing line, and each of the lines has an edge including a plurality of turning angles, each of which is between 20 degrees and 150 degrees, and not equal to 90 degrees; and
 causing each edge to be not parallel to either one of the X axis and the Y axis to avoid the Moiré phenomenon generated between the touch panel and the pixel layout.

12. A method for eliminating a Moiré phenomenon on a screen, wherein the screen includes a touch panel and an LCD, the LCD has a pixel layout, the pixel layout has a black matrix with an X axis and a Y axis, the touch panel includes a plurality of touch units, and the method comprises:
 providing a plurality of electrode lines for each the touch unit, each electrode line has an edge with a plurality of turning angles, each of which is between 20 degrees and 150 degrees, and not equal to 90 degrees; and
 causing each edge to be not parallel to either one of the X axis and the Y axis.

\* \* \* \* \*